United States Patent [19]

Miyata et al.

[11] Patent Number: 4,463,623
[45] Date of Patent: Aug. 7, 1984

[54] TRACTOR TRANSMISSION STRUCTURE

[75] Inventors: Junji Miyata, Kyoto; Yasuhisa Matsushita, Sakai, both of Japan

[73] Assignee: Kubota, Ltd., Osaka, Japan

[21] Appl. No.: 316,486

[22] Filed: Oct. 29, 1981

[30] Foreign Application Priority Data

May 20, 1981 [JP] Japan .................. 56-73475[U]

[51] Int. Cl.³ .................. B60K 20/02; F16H 3/02
[52] U.S. Cl. .................. 74/473 R; 74/745
[58] Field of Search .................. 74/473 R, 745

[56] References Cited

U.S. PATENT DOCUMENTS

| 2,917,941 | 12/1959 | Wittren | 74/473 R |
|---|---|---|---|
| 3,214,987 | 11/1965 | Schenck et al. | 74/473 R |
| 3,250,145 | 5/1966 | Harper | 74/473 R |
| 3,369,424 | 2/1968 | Frey | 74/473 R |
| 3,433,087 | 3/1968 | Winter et al. | 74/473 R |
| 3,741,035 | 6/1973 | May | 74/745 |
| 3,795,157 | 3/1974 | Campbell et al. | 74/473 R X |
| 3,955,437 | 5/1976 | Heintz | 74/473 R |
| 4,085,833 | 4/1978 | Papasideris | 74/473 R X |
| 4,216,680 | 8/1980 | Hayashi et al. | 74/473 R |
| 4,324,149 | 4/1982 | Johansson et al. | 74/473 R |
| 4,343,202 | 8/1982 | Osborn | 74/473 R |
| 4,346,618 | 8/1982 | Sakamoto et al. | 74/473 R X |

FOREIGN PATENT DOCUMENTS

| 2502578 | 7/1976 | Fed. Rep. of Germany | 74/473 R |
|---|---|---|---|
| 946867 | 6/1949 | France | 74/473 R |
| 2033501 | 5/1980 | United Kingdom | 74/473 R |

*Primary Examiner*—Allan D. Herrmann
*Assistant Examiner*—Stephen B. Andrews
*Attorney, Agent, or Firm*—Cushman, Darby & Cushman

[57] ABSTRACT

A tractor transmission structure including a first and a second gear transmissions operatively connected in series, each gear transmission providing two speeds. The invention provides a single change-speed lever to operate the two gear transmissions. The change-speed lever is guided along a U-shaped opening to obtain three speeds from the gear transmissions, a low speed, an intermediate speed and a high speed.

5 Claims, 6 Drawing Figures

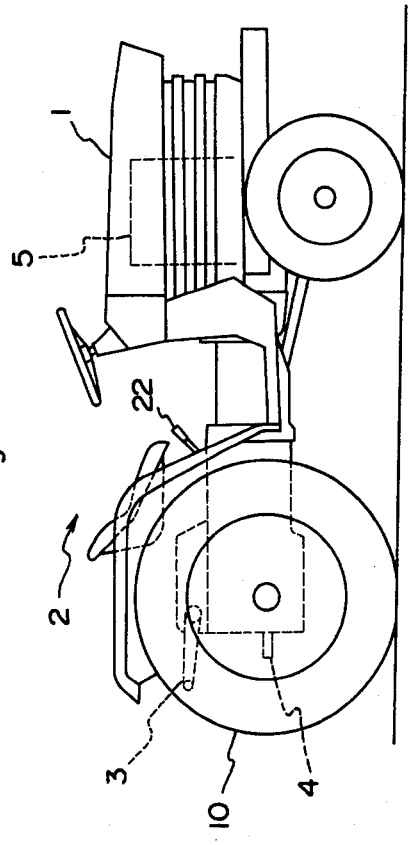
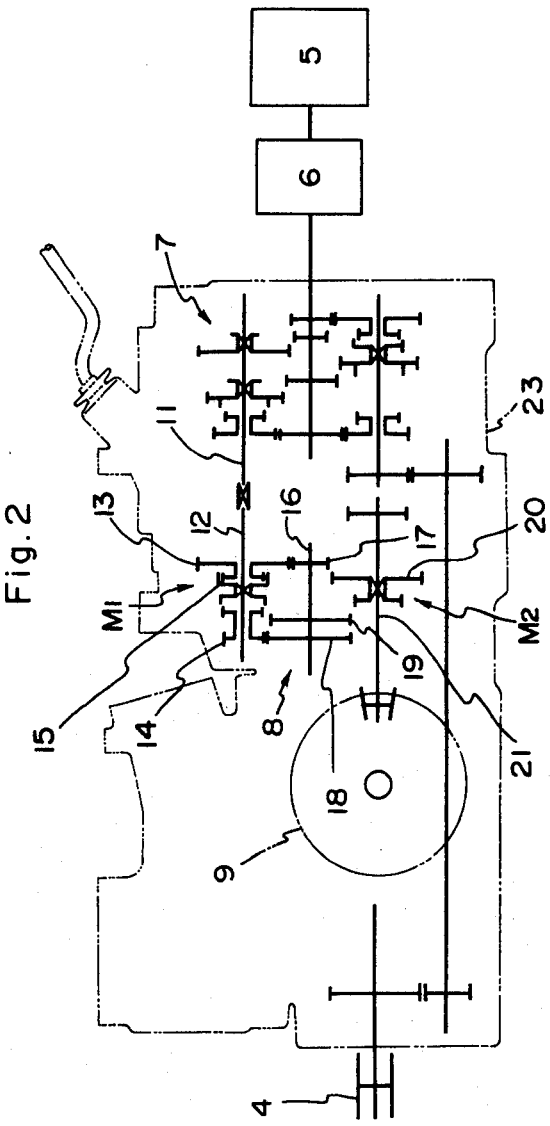
Fig. 1
Fig. 2

TRACTOR TRANSMISSION STRUCTURE

Background of the Invention

1. Field of the Invention

The present invention relates to tractor transmissions, and in particular to a transmission structure including first and a second gear transmissions operatively connected to each other in series, each gear transmission providing two speeds. Of the four speeds available from the combination of the two gear transmissions, only three are utilized. That is to say, one of the two intermediate speeds is not utilized since one gear transmission in a high speed position is almost equal to the other in a low speed position.

2. Description of the Prior Art

The first and second gear transmissions operatively connected to each other in series, each providing two speeds, namely a high speed and a low speed, as described above are normally operated by two hand levers, which makes the operation complicated and troublesome. Furthermore, although a total of four speeds are available from the combination of the two gear transmissions each providing two, high and low, speeds, one of these speeds is substantially redundant and makes the corresponding portion of the operation wasteful. Therefore, an improved construction has been desired in order to realize a rational operation in a simple way.

Summary of the Invention

The object of the present invention is to provide a rationally constructed change-speed structure to facilitate speed-changing operations.

A tractor transmission according to the present invention comprises first and second gear transmissions including change-speed operator portions respectively, a change-speed lever operatively connected to the change-speed operator portions through interlocking link means, and guide means defining a substantially U-shaped opening for guiding the change-speed lever, the substantially U-shaped opening extending longitudinally of a tractor body, the change-speed lever being adapted to selectively assume positions at extreme ends of right and left arms of the substantially U-shaped opening and at a portion of the opening interconnecting the right and left arms to selectively provide a first speed state in which the first and second gear transmissions are in low speed positions, a second speed state in which the first gear transmission is in a high speed position and the second gear transmission is in the low speed position, and a third speed state in which the first and second gear transmission are in the high speed positions.

Thus, the invention provides two gear transmissions which are operable by shifting a single change-speed lever only. Moreover, the lever operations to switch change-speed positions of the gear transmission which require a relatively large operational force are now effected in longitudinal directions of the tractor body and at a relatively short stroke. On the whole, therefore, the change-speed operation is simplified and expedited in respect of both the amount of operation and the force of operation, thereby realizing an easy changing of traveling speed.

Other objects and advantages of the present invention will become apparent from the following description.

Brief Description of the Drawings

In the drawings illustrating a tractor transmission structure according to the present invention,
FIG. 1 is a side elevation of an agricultural tractor,
FIG. 2 is a diagram showing a transmission system.

Description of the Preferred Embodiment

Figure 3:
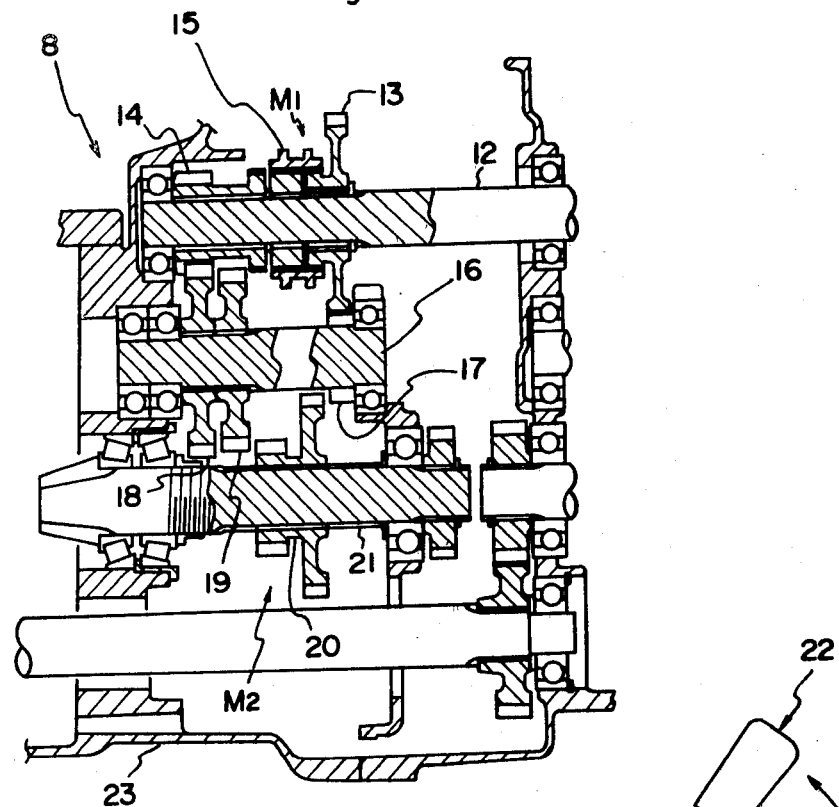
FIG. 3 is a sectional view of gear transmissions.

Referring to FIG. 1, an agricultural tractor is shown comprising a self-propelled wheeled vehicle having a prime mover section 1 at the front and a driver's section 2 rearwardly of the prime mover section 1. The vehicle is equipped with a lift arm 3 to which a working implement such as a rotary cultivator is attached to be vertically movable relative to the vehicle body, and a power takeoff shaft to drive the attached working implement. Thus the tractor shown is adapted to carry one of varied agricultural implements at the rear which is vertically moved and driven according to the driver's operations.

Referring to FIG. 2 showing a drive system for the tractor's traveling at varied speeds, power of an engine 5 is transmitted to a main clutch 6 and then through a gear type main change-speed mechanism 7 and a gear type auxiliary change-speed mechanism 8 to a differential mechanism 9 for driving rear wheels 10. The rear wheels 10 are driven backward and forward and at varied speeds by operating the main clutch 6 and the main and auxiliary change-speed mechanisms 7 and 8.

The auxiliary change-speed mechanism 8 is constructed as follows:

As shown in FIGS. 2 and 3, an input shaft 12 operatively connected to an output shaft 11 of the main change-speed mechanism 7 carries a first output gear 13 and a second output gear 14 having different diameters, the two gears 13 and 14 being rotatable and not slidable relative to the input shaft 12. The input shaft 12 also carries a change-speed gear 15 which is mounted thereon through a spacer 15a slidably relative to the input shaft 12 and rotatably together with the input shaft 12. When the change-speed gear 15 meshes with the first output gear 13, the first output gear 13 is operatively connected to the input shaft 12 through the change-speed gear 15 to provide a high speed. When the change-speed gear 15 meshes with the second output gear 14, the second output gear 14 is operatively connected to the input shaft 12 through the change-speed gear 15 to provide a low speed. Therefore, two speeds, high and low, are obtained by switching the change-speed gear 15 between a position to mesh with the first output gear 13 and a position to mesh with the second output gear 14. This construction constitutes a first gear transmission M1. There is provided a further input shaft 16 carrying a first input gear 17, a second input gear 18 and a transmission gear 19, the three gears 17, 18 and 19 being rotatable together with the input shaft 16 and not slidable thereon. An output shaft 21 carries a change-speed gear 20 rotatable together with the output shaft 21 and slidable thereon. When the change-speed gear 20 meshes with the transmission gear 19, the output shaft 21 is operatively connected to the input shaft 16 through the two gears 19 and 20 to provide a high speed. When the change-speed gear 20 meshes with the first input gear 17, the input shaft 16 and the output shaft 21 are operatively connected to each other through the two gears 17 and 20 to provide a low speed. Therefore, two speeds, high and low, are obtained by switching the change-speed gear 20 between a position to mesh with the transmission gear 19 and a position to mesh with the first input gear 17. This construction constitutes a second gear transmission M2. The first gear transmission M1 and the second gear transmission M2 are operatively connected in series, the two output gears 13 and 14 of the first gear transmission M1 being in mesh with the two input gears 17 and 18 of the second gear transmission M2, respectively.

Figure 4:
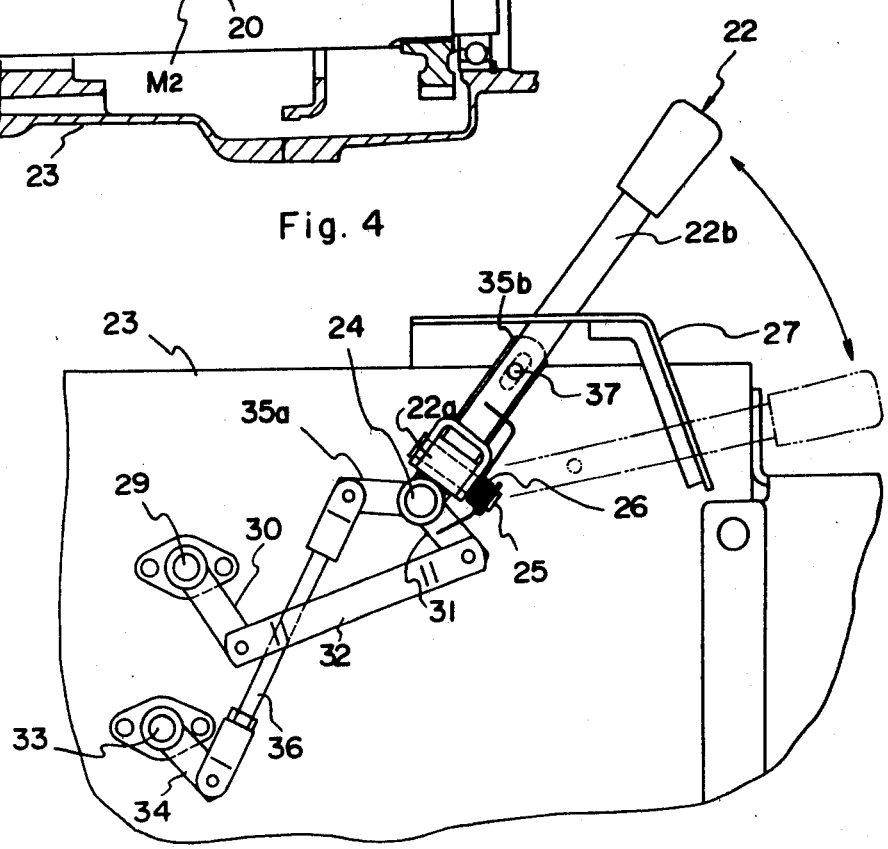
FIG. 4 is a side view of an interlocking mechanism.
Figure 5:
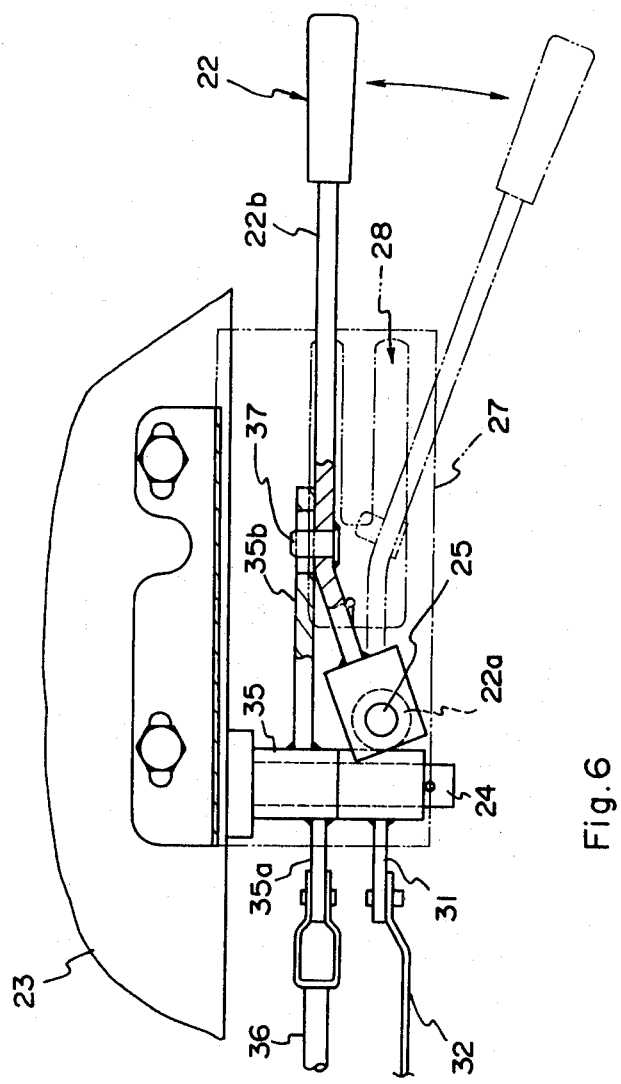
FIG. 5 is a plan view showing how a change-speed lever is mounted.
Figure 6:
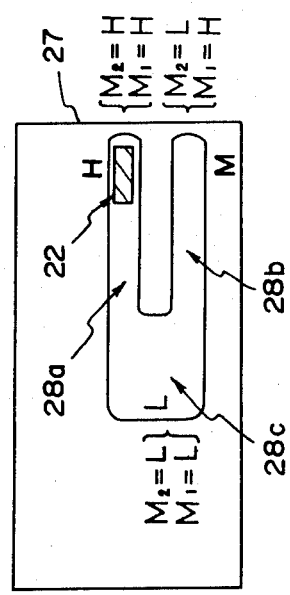
FIG. 6 is a plan view showing a lever guide.

Referring to FIGS. 4 and 5, a change-speed lever 22 comprises a base portion 22a pivotably attached to a support rod 24 provided in a transmission case 23 and extending transversely of the tractor body, and a grip carrying portion 22b connected to the base portion 22a flexibly about an axis 25 extending longitudinally of the tractor body and urged towards a stretch position by a spring 26. A lever guide 27 is provided which defines a substantially U-shaped opening 28 extending longitudinally of the tractor body, as shown in FIG. 6. The opening 28 receives the grip carrying portion 22b of the change-speed lever 22, whereby the lever 22 is shiftable along the opening 28.

As best shown in FIG. 4, the change-speed lever 22 is operatively connected to the first and second gear transmissions M1 and M2 through an interlocking link mechanism. A rotatable operator portion 29 is operatively connected to a shift fork (not shown) for the first gear transmission M1. An oscillatable arm 30 is rigidly attached to this rotatable operator portion 29. The base portion 22a of the change-speed lever 22 includes a boss for mounting on the support rod 24, and from this boss extends an oscillatable arm 31 rigidly attached to the boss. The two arms 30 and 31 are interlocked by a push-pull member 32. A further rotatable operator portion 33 is operatively connected to a shift fork (not shown) for the second gear transmission M2. An oscillatable arm 34 is rigidly attached to this rotatable operator portion 33. An oscillatable member 35 is mounted on the support rod 24 rotatably relative to the support rod 24 and including a first arm portion 35a which is interlocked with the arm 34 by a push-pull member 36. The grip carrying portion 22b of the change-speed lever 22 has a pin 37 projecting therefrom to engage with and disengage from a hole defined in a second arm portion 35b of the oscillatable member 35 thereby to switch, with flexion of the change-speed lever 22, between an interlocking position in which the change-speed lever 22 and the oscillatable member 35 are oscillatable in a unitary manner and a non-interlocking position in which the change-speed lever 22 and the oscillatable member 35 are oscillatable relative to each other.

The shifting operation of the change-speed lever causes the two rotatable operator portions 29 and 33 to be operated by way of the described interlocking link mechanism, and this is particularly described hereinafter. Both the operator portions 29 and 33 are operated when the change-speed lever 22 is shifted along the lefthand arm 28a of the U-shaped guide opening 28. When the change-speed lever 22 is shifted within a portion 28c of the opening interconnecting the right and left arms 28a and 28b, respectively only the operator portion 29 of the first gear transmission M1 is moved into and out of operative connection with the change-speed lever 22. When the change-speed lever 22 is shifted along the righthand arm 28b of the U-shaped opening 28, only the operator portion 29 of the first gear transmission M1 is operated. When the change-speed lever 22 assumes a third position H at an extreme end of the lefthand arm 28a as shown in FIG. 6, the two operator portions 29 and 33 cause the first and second gear transmissions M1 and M2 to provide the high speed, respectively. When the lever 22 assumes a first position L at the interconnecting opening portion 28c, the two transmissions M1 and M2 both provide the low speed. When the lever 22 assumes a second position M at an extreme end of the righthand arm 28b of the U-shaped opening 28, the second gear transmission M2 provides the low speed and the first gear transmission M1 provides the high speed.

In summary, a total of three speeds are obtained by shifting the change-speed lever 22 along the U-shaped guide opening 28. By shifting the lever 22 to the first position L, a first speed state is obtained in which both gear transmissions M1 and M2 provide the low speed, respectively. By shifting the lever 22 to the second position M, a second speed state is obtained in which the first gear transmission M1 provides the high speed and the second gear transmission M2 provides the low speed. By shifting the lever 22 to the third position H, a third speed state is obtained in which both gear transmissions M1 and M2 provide the high speed, respectively.

It should be understood that, in determining the first to third positions of the change-speed lever 22 to selectively obtain the first to third speed states, the first to third positions in the substantially U-shaped opening may be arranged in a different order than that described above, by changing the change-speed mechanisms of the first and second gear transmissions M1 and M2 or the construction of the interlocking link mechanism. In short, it is in accordance with the present invention if the selective shifting of the change-speed lever 22 to the first to third positions results in the selective provision of the first to third speed states.

The described transmission structure of the present invention is applicable to varied working vehicles such as those for transportation and construction purposes.

We claim:

1. A tractor transmission structure comprising first and second gear transmission operatively connected in series and including first and second change speed operator portions, respectively, and a change speed lever operatively connected to said change speed operator portions through interlocking link means, said change speed lever being shiftable along a substantially U-shaped guide opening defined by right and left arms (28a, 28b) and an interconnecting portion (28c), said guide opening extending longitudinally of the tractor body, wherein said interlocking link means disengages from its operative connection with one of said change speed operator portions (29, 33) when said change speed lever1 (22) shifts within said interconnecting portion (28c) interconnecting said right and left arms (28a, 28b) of said substantially U-shaped guide opening (28), said change speed lever (22) selectively assuming first, second and third positions at the extreme ends of said right and left arms (28a, 28b) of said guide opening (28) and at said interconnecting portion (28c) interconnecting said right and left arms (28a, 28b), respectively, to selectively provide a first speed state in which said first and second gear transmissions (M1, M2) are each in the low speed positions, a second speed state in which said first gear transmission (M1) is in a high speed position and said second gear transmission (M2) is in a low speed position, and a third speed state in which said first and second gear transmissions (M1, M2) are each in the high speed positions.

2. A tractor transmission structure as claimed in claim 1 further comprising a main change-speed mechanism (7) operatively connected to said first gear transmission (M1), wherein said first and second gear transmissions (M1, M2) constitute an auxiliary speed-change mechanism (8) as opposed to said main speed-change mechanism (7).

3. A tractor transmission structure as claimed in claim 1 or 2 wherein said change-speed lever (22) includes a base portion (22a) pivotably attached to a support rod (24) extending transversely of the tractor body and a grip carrying portion (22b) connected to said base portion (22a) flexibly about an axis (25) extending longitudinally of the tractor body and urged towards a stretch position by a spring (26), said guide means (27) defining said substantially U-shaped opening (28) being adapted to receive and guide said grip carrying portion (22b).

4. A tractor transmission structure as claimed in claim 3 wherein said interlocking link means comprises a first arm (30) osciallatably attached to said change-speed operator portion (29) of said first gear transmission (M1), said change-speed operator portion (29) comprising a rod rotatable together with said first arm (30) as the latter oscillates, a second arm (31) extending from a boss defined at said base portion (22b) of said speed-change lever (22) for mounting on said support rod (24), said second arm (31) being oscillatable together with said base portion (22b), a push-pull member (32) interlocking said first and second arms (30, 31), a third arm (34) oscillatably attached to said change-speed operator portion (33) of said second gear transmission (M2), said change-speed operator portion (29) of said second gear transmission (M2) comprising a rod rotatable together with said third arm (34) as the latter oscillates, an oscillatable member (35) mounted on said support rod (24) oscillatably relative to said support rod (24), a further push-pull member (36) interconnecting said third arm (34) and a first arm portion (35a) of said oscillatable member (35), and a pin (37) projecting from said grip carrying portion (22b) of said change-speed lever (22) to engage with and disengage from a hole defined in a second arm portion (35b) of said oscillatable member (35) thereby to switch, with flexion of said change-speed lever (22) between an interlocking position in which the change-speed lever (22) and the oscillatable member (35) are oscillatable in a unitary manner and a non-interlocking position in which the change-speed lever (22) and the oscillatable member (35) are oscillatable relative to each other.

5. A tractor transmission structure comprising:
first and second gear transmissions operatively connected in series, said first and second gear transmissions respectively including first and second speed change operator means for changing the associated gear transmission between high and low speed positions;
means defining a U-shaped guide opening to establish a U-shaped shift pattern, said guide opening being defined by first and second leg openings respectively establishing first and third shift positions, said first and second leg openings being separated from one another by a base opening which establishes a second shift position;
a manually operable speed change shift lever mounted in said U-shaped guide opening so as to be shiftable between said first, second and third shift positions established by said U-shaped guide opening; and
linkage means operatively interconnecting said shift lever with said first and second speed change operator means, said linkage means for (a) selectively changing each said first and second gear transmissions to said low speed position in response to said shift lever being manually shifted into said first shift position, (b) selectively changing said first gear transmission to said high speed position and said second gear transmission to said low speed position in response to said shift lever being manually shifted into said second shift position, and (c) selectively changing each said first and second gear transmissions to said high speed position in response to said shift lever being manually shifted into said third shift position.

* * * * *